United States Patent [19]

Brunnett

[11] Patent Number: 4,752,879
[45] Date of Patent: Jun. 21, 1988

[54] METHOD AND APPARATUS FOR MEDICAL IMAGING

[75] Inventor: Carl J. Brunnett, Mayfield Heights, Ohio

[73] Assignee: Picker International, Inc., Highland Heights, Ohio

[21] Appl. No.: 696,405

[22] Filed: Jan. 30, 1985

[51] Int. Cl.$^4$ ............................................. G06F 15/42
[52] U.S. Cl. ..................................... 364/414; 378/901
[58] Field of Search ................. 364/414; 378/99, 901; 358/111, 160, 163, 283

[56] References Cited

U.S. PATENT DOCUMENTS

| | | | |
|---|---|---|---|
| 4,136,388 | 1/1979 | Lindquist | 364/414 |
| 4,178,510 | 12/1979 | Wagner | 364/414 |
| 4,184,206 | 1/1980 | Harano | 364/515 |
| 4,228,465 | 10/1980 | Stone et al. | 378/99 |
| 4,295,195 | 10/1981 | Hounsfield | 378/901 |
| 4,433,380 | 2/1984 | Abele et al. | 364/414 |
| 4,549,265 | 10/1985 | Deckers et al. | 364/414 |
| 4,559,557 | 12/1985 | Keyes et al. | 358/111 |

Primary Examiner—Charles E. Atkinson
Assistant Examiner—Kimthanh Tbui
Attorney, Agent, or Firm—Watts, Hoffmann, Fisher & Heinke Co.

[57] ABSTRACT

An improved medical diagnostic imaging method and apparatus. In both, Nuclear Magnetic Resonance and Computed Tomography imaging artifacts caused by the finite number of directions from which imaging data is obtained is minimized. An image is constructed and then modified by adjusting each image element with contributions from neighboring picture elements. When all picture elements have been so modified an improved image approximating a result that would have been achieved by interpolating and then reconstructing image data is obtained.

5 Claims, 3 Drawing Sheets

METHOD AND APPARATUS FOR MEDICAL IMAGING

DESCRIPTION

1. Technical Field

The present invention relates to method and apparatus for enhancing diagnostic medical images and is particularly adapted to enhancing computed tomography images.

2. Background Art

In both emission and transmission computed tomography and in magnetic reasonance imaging, information concerning the internal structure of a subject of interest is obtained without invasive procedures. In magnetic reasonance imaging, a magnetic field is imposed upon a region of interest and the response of atoms making up the structure of this region is studied. By imposing a uniform magnetic field gradient from a number of orientations and ascribing characteristics to the internal matter based upon electromagnetic measurements taken in response to the magnetic field scanning, the internal structure of the patient is discerned.

In computed tomography a two dimensional image is generated from multiple one dimensional projections. A source of x-radiation transmits X-rays through a subject of interest and the attenuation of that radiation is monitored on an opposite side by one or more detectors. If the source is moved about the patient and X-ray attenuation data is obtained from a number of directions, a computed tomography reconstruction process can be utilized to generate an image of the subject cross-section.

It has been shown that the discrete or finite number of angular positions at which information is obtained in either magnetic resonance imaging or computed tomography can affect image quality. In computed tomography the finite number of positions can result in streak type artifacts. Generally, if high resolution, high contrast images are required, a greater number of angular views is needed to reduce this type of artifact to an acceptable level.

Directly increasing the number of views by collecting more data is only obtainable at an increase in cost and reduction in scanning speed. In a fourth generation computed tomography scanner for example, additional data can be obtained by using a greater number of more densely packed detectors. The higher number of detectors cost more and require more analyzing circuits which also adds to the cost of the scanner.

It has been shown that one technique for reducing the streak artifacts caused by the limited number of views is to synthesize additional views by interpolating between actual measurements. This procedure, however, increases the amount of data that must be processed in constructing an image. This additional processing increases the time to reconstruct an image and/or the cost of the reconstruction hardware since both actual data and interpolated data must be filtered and backprojected to create an image.

DISCLOSURE OF INVENTION

In accordance with the present invention, a reduction in the artifacts caused by the finite number of angular views is achieved without an increase in the amount of data which must be reconstructed. The disclosed method and apparatus reduces the artifacts without substantially increasing reconstruction time or cost of the equipment.

The invention is applicable to all types of computed tomography and other imaging equipment that reconstruct a two dimensional image from a finite number of one dimension projections. The disclosed process enhances image quality by modifying image data. The data of one region of the image is modified by data from closely adjacent regions of the image. In a preferred process each image region or picture element is modified by combining image data of that element with contributions from eight neighboring elements. An alternate and faster process involves combining the image data from each element with contributions from only four adjoining elements.

The invention has utility in both emission and transmission computed tomography and magnetic reasonance imaging. In computed tomography, the data is reconstructed to provide a first image which is modified by taking each region within the image and adjusting it based upon closely neighboring image regions. The preferred procedure closely approximates the results obtained by interpolating raw data to increase the number of views in a scan.

Some advantages of the invention are in reduced time for data collection and for image reconstruction and no addition of pre-image processing electronics. The non-interpolated data is filtered and backprojected to form an image. This image is then modified to approximate results achieved if an interpolation of the measured data were performed. The streaks or artifacts experienced in the prior art are removed without significant increases in time and/or cost.

From the above it should be appreciated that one object of the invention is a new and improved diagnostic imaging procedure for reducing artifacts without increasing the time and/or cost of the imaging. This and other objectives, advantages and features of the invention will become better understood when a preferred embodiment is described in conjunction with the accompanying figures.

BEST MODE FOR CARRYING OUT THE INVENTION

Figure 1:
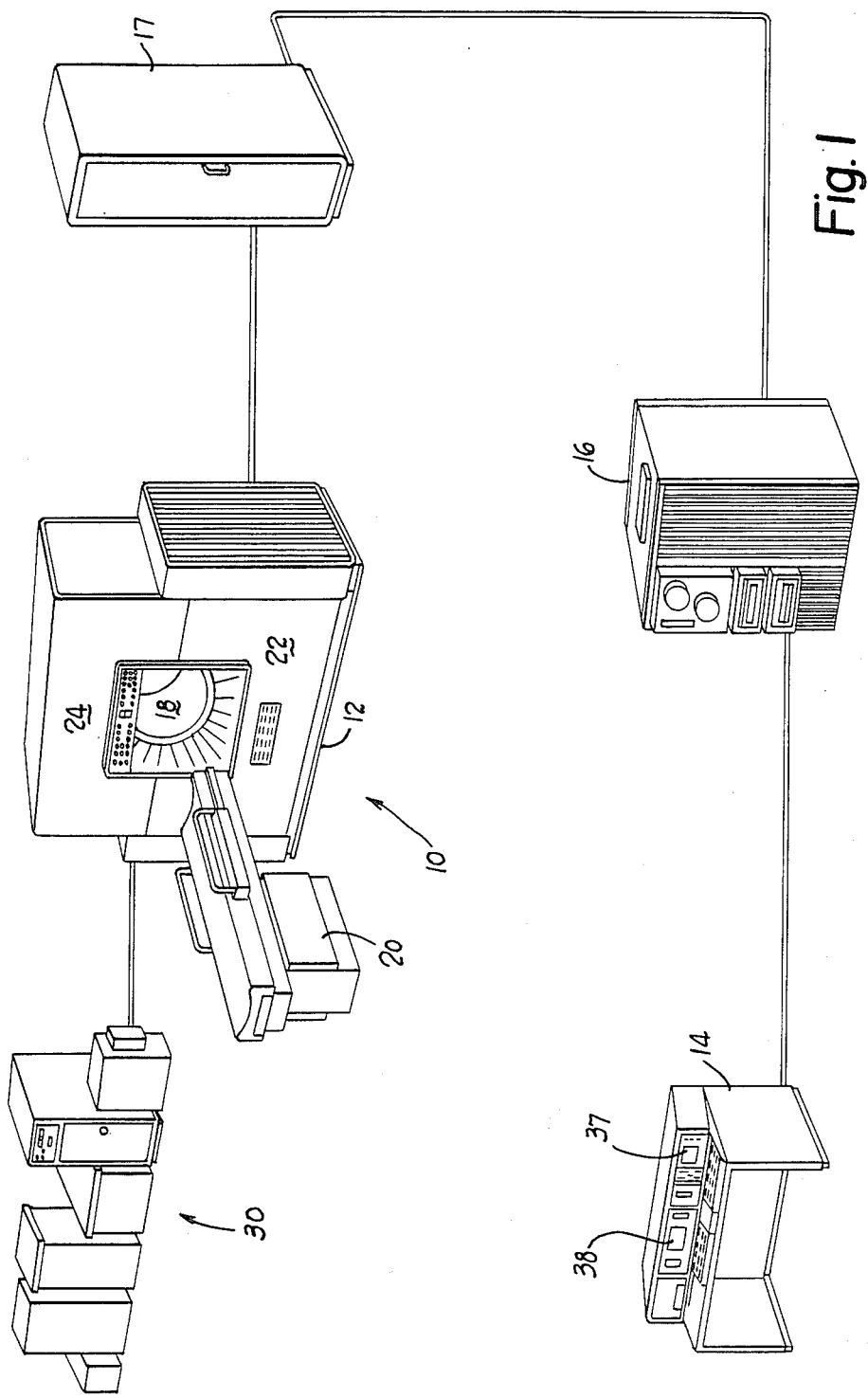
FIG. 1 is a perspective view of a computed tomography imaging station.

Turning now to the drawings, FIG. 1 illustrates a computed tomography scanning system 10 used in imaging cross-sectional slices of interest in a patient. The computed tomography system 10 comprises a scanner 12, a viewing console 14, a computer 16, and specialized electronics 17 needed by the scanner 12 for control and data handling.

The scanner 12 is a fourth generation computed tomography scanner having a fixed array of detectors surrounding a patient aperture 18. During imaging a patient is positioned on a couch 20 and then moved into and through the patient aperture 18 until a cross-sectional slice to be imaged is appropriately positioned. A scanner front panel is divided into two portions 22, 24 which are hinged to the scanner housing. These two portions swing away from the position they are shown in FIG. 1 to allow the interior of the scanner 12 to be accessed. A series of electronic subsystems 30 shown to the side of the computed tomography scanner 12 provide voltages suitable for creating X-radiation.

In computed tomography scanning, special electronics 17 analyzes intensity values detected by the scanner 12. This specialized electronics 17 measures the output from the scanner detectors as well as controls movement of an X-ray tube and coordinates this movement with the analysis of the output signals.

High speed computed tomography imaging is possible only through use of a high speed data processing computer 16. The illustrated and presently preferred computer 16 is a 32 bit Perkin-Elmer mini computer. The computer 16 performs the data processing for reconstructing an image of attenuation variations inside the patient slice from intensity readings taken from a plurality of detectors surrounding the patient aperture. The particular computer chosen is responsible for not only analyzing and reconstructing cross-sectional image densities but also for displaying this information on a console 14. The console depicted in FIG. 1 includes a first CRT 37 for a technician operating the computed tomography apparatus and a second CRT 38 for a person responsible for diagnosing the images produced.

Each preferred detector comprises a scintillation crystal coupled to a photodiode. X-radiation impinges upon the scintillation crystal and is converted to visible light which in turn causes current flow in the photodiode. The current produced by the X-radiation is converted from an analog current signal into a sequence of pulses which are counted.

Electronics for generating these pulses in response to current changes in the photodiode are known in the art. The pulses are then counted and divided by the time period in which they are counted to obtain an indication of the intensity of the X-radiation impinging upon the detector at a given time. Circuitry for performing this counting function is disclosed in U.S. Pat. No. 4,052,620 to Brunnett which is assigned to the assignee of the present invention. That prior patent is incorporated herein by reference.

The steps of detecting the radiation 50 and generating the pulses 51 as well as determining the intensity 52 are depicted in a flow chart (FIG. 2) schematically describing the computed tomography process. These three steps 50, 51, 52 are followed by taking the logarithm of the data and a storing 54 of that data in the computer. The logarithm of the intensity data yields attenuation information.

The remaining steps in the computed tomography process are performed by the computer 16. The computer first performs a series of calibration and correction calculations 56 on the data. These calculations are based upon data obtained during a CT set-up phase. These calculations take into account variations in detector sensitivity, gain, and offsets in the electronics. Once these calibration steps have been completed, a digital filtering step 58 is performed where all data from each detector is filtered in accordance with a filter function. The process consists of performing a forward fast fourier transform (FFT) of the data, multiplying the transformed data by a frequency filter and then performing an inverse FFT to produce the filtered data.

At a next stage of the computed tomography process, filtered data for those detectors which are not functioning is assigned 64 based upon the filtered data from those detectors which are supplying valid data. Finally, all data, both from those detectors that are functioning and those which are not, are back projected 66 into a memory to produce an image of a particular patient slice under examination. Once this backprojection process has been completed, this data is again stored and utilized in imaging 68 a picture of this slice on the console 14.

Figure 3:
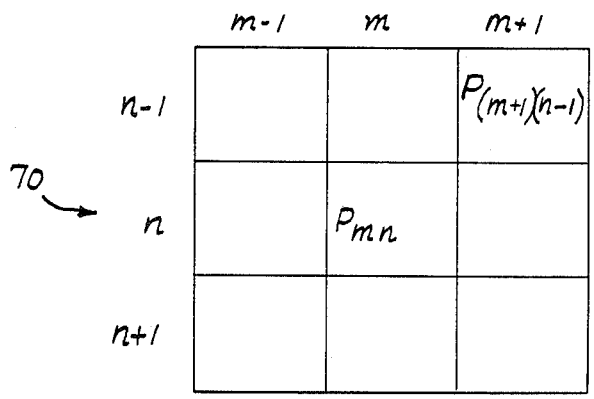
FIG. 3 is a representative portion of an image generated by the FIG. 2 processing steps.

FIG. 3 illustrates a portion 70 of the console CRT 37 enlarged many times so that individual picture elements are clearly delineated. In the FIG. 3 representation a orthogonal coordinate system is depicted and the terminology $P_{mn}$ denotes a pixel at column m and row n of the display. As seen in the Figure, pixel $P_{mn}$ is contiguous with four other pixels $P_{(m-1)n}$, $P_{(m+1)n}$, $P_{m(n-1)}$, $P_{m(n+1)}$ and diagonally adjacent to four pixels $P_{(m+1)(n+1)}$, $P_{(m+1)(n-1)}$, $P_{(m-1)(n+1)}$ and $P_{(m-1)(n-1)}$.

Figure 2:
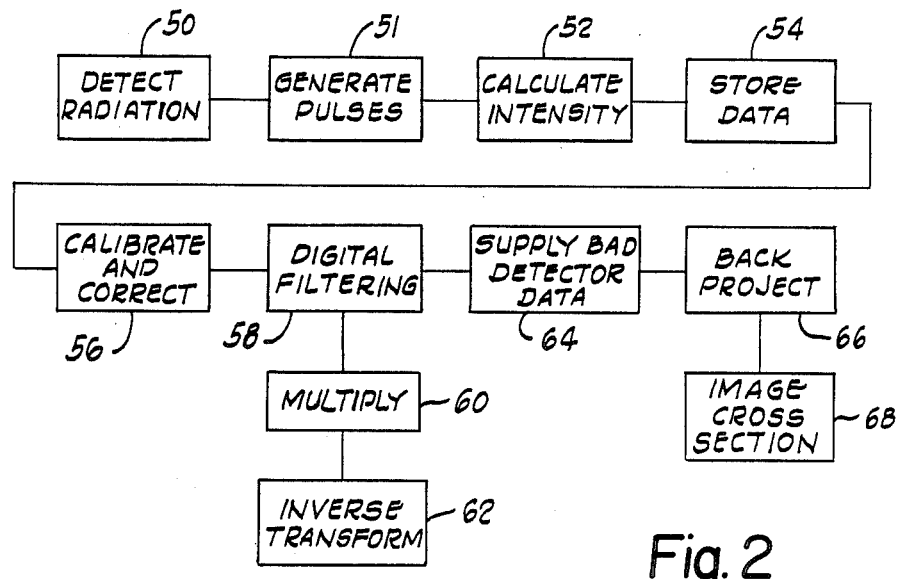
FIG. 2 is a flow chart of data processing steps in computed tomography imaging.

In accordance with the invention, all the steps summarized in FIG. 2 are performed so that a value $D_{mn}$ is assigned each pixel of the image. This original value is then modified to produce a resultant value $R_{mn}$ for each pixel to produce a display having less artifact than the original display. The image formed by all pixels using the modified values $R_{mn}$ is displayed on the console 38.

Modifying the pixel values does not require additional electronics or more detectors. Each neighboring pixel in FIG. 3 contributes to the modification of $P_{mn}$ in a way to reduce artifacts in the modified image. The entire image is modified in a time far less than the time it would take to reconstruct an image using interpolated attenuation data.

The procedure for modifying the pixel values $D_{mn}$ with factors from its eight neighboring pixels is embodied in the following equation:

$$R_{mn} = D_{mn} + \frac{d_y}{4}[D_{m(n-1)} + D_{m(n+1)} - 2D_{mn}] + \frac{d_y}{4}[D_{(m-1)n} + D_{(m+1)n} - 2D_{mn}] + \frac{d_y d_x}{4}[2D_{mn} + D_{(m+1)(n+1)} + D_{(m-1)(n-1)} - D_{(m-1)n} - D_{(m+1)n} - D_{m(n-1)} - D_{m(n+1)}] \quad (1)$$

The process of calculating resultant pixel values $R_{mn}$ is one of adding (or subtracting) the pixel values from the original image and multiplying by weighing coefficients ($d_x$, $d_y$) stored in look-up tables to calculate modified pixel values. This post processing technique and the prior art interpolation technique for reducing artifacts produce approximately the same images. To see why this is so, consider the prior art interpolation process.

Let $A_j$ represent the real data of the jth projection.

Let N be the total number of real projections so that j takes on all integer values between 1 and N to represent all real data collected.

Consider the case where an equal number of phantom projections are created and interleaved in angle between the real projections.

Let $K_i$ represent the phantom projection data, where i takes on all integer values between 1 and N.

Using simple linear interpolation, one can synthesize the phantom data $K_i$ that falls between real views $A_j$ and $A_{j+i}$ as follows:

$$K_i = \frac{A_j}{2} + \frac{A_{(j+1)}}{2} = \frac{A_j + A_{(j+1)}}{2}$$

Let $\theta_j$ represent the angular orientation of view $A_j$ and $\theta_i$ represent the angular orientation of view $K_i$ also let $\Delta\theta$ equal the angular increment between adjacent real views, hence $\Delta\theta = \theta_{(j+1)} - \theta_j = 360°/N$ then $$\theta_i = \frac{\theta_j}{2} + \frac{\theta_{(j+1)}}{2} = \frac{\theta_j + \theta_{(j+1)}}{2} = \theta_j + \frac{\Delta\theta}{2} = \theta_{(j+1)} \frac{-\Delta\theta}{2}$$

In the interpolated phantom view method, all views, both real and phantom, are backprojected at their respective real and phantom angles. Because there are twice the number of views, a scaling factor of ½ must be introduced either before or after the reconstruction process.

Because backprojection is a linear process, for analysis purposes, it is valid to consider several separate reconstructions from sub-sets of the total number of views, and then add these interim images to obtain the final result. This final image will be identical to the original one obtained by backprojecting all views, providing that each view is used once and only once in creating the interim images.

Now examine the complete backprojection process:
(1) all real projections ($A_j$) are backprojected at $\theta_j$.
(2) all phantom projections ($K_i$) are backprojected at $\theta_i$.

Regarding the second step, recall that $$K_i = \frac{A_j}{2} + \frac{A_{(j+1)}}{2} \text{ and } \theta_i = \theta_j + \frac{\Delta\theta}{2} = \theta_{(j+1)} - \frac{\Delta\theta}{2}$$

In accordance with the previous discussion, one can accomplish this reconstruction by backprojecting 3 subsets of views and then adding the images. Specifically:

(1) backproject all $A_j$ projections at their respective $\theta_j$ angles to form a first image (designate this image as $I_1$).

(2) backproject all $A_j$ projections divided by 2 (i.e., $A_j/2$) at angles $\theta_j + \Delta\theta/2$ to form the second image ($I_2$).

(3) backproject all $A_j$ projections divided by 2 at angles $\theta_j - \Delta\theta/2$ to form $I_3$.

Now observe that image $I_2$ is identical to $I_1$ except that it is scaled by ½ and rotated thru an angle of $\Delta\theta/2$. Also $I_3$ is identical to $I_1$ except that it is scaled by ½ and rotated by $-\Delta\theta/2$.

The scaling operation of images $I_2$ and $I_3$ is a simple task. The rotation of the image is approximated by performing an interpolation on the original image $I_1$ instead of going through the complete reconstruction process.

Figure 4:
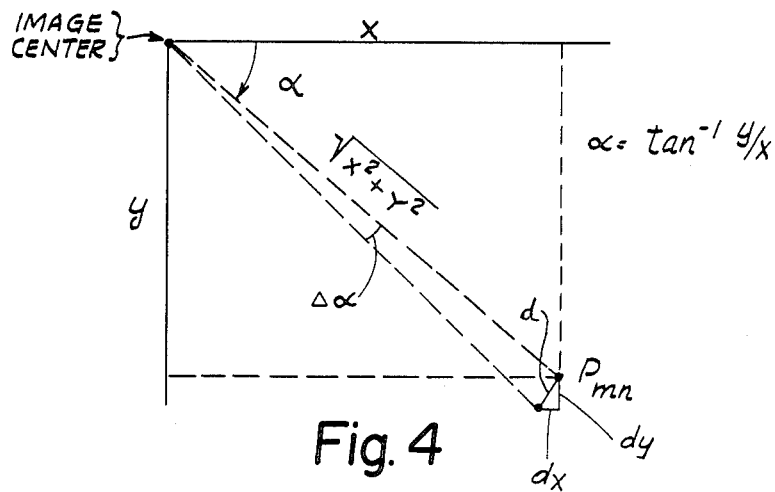
FIG. 4 shows an image pixel and parameters used in deriving an approximation to a prior art interpolation process.
Figure 5:
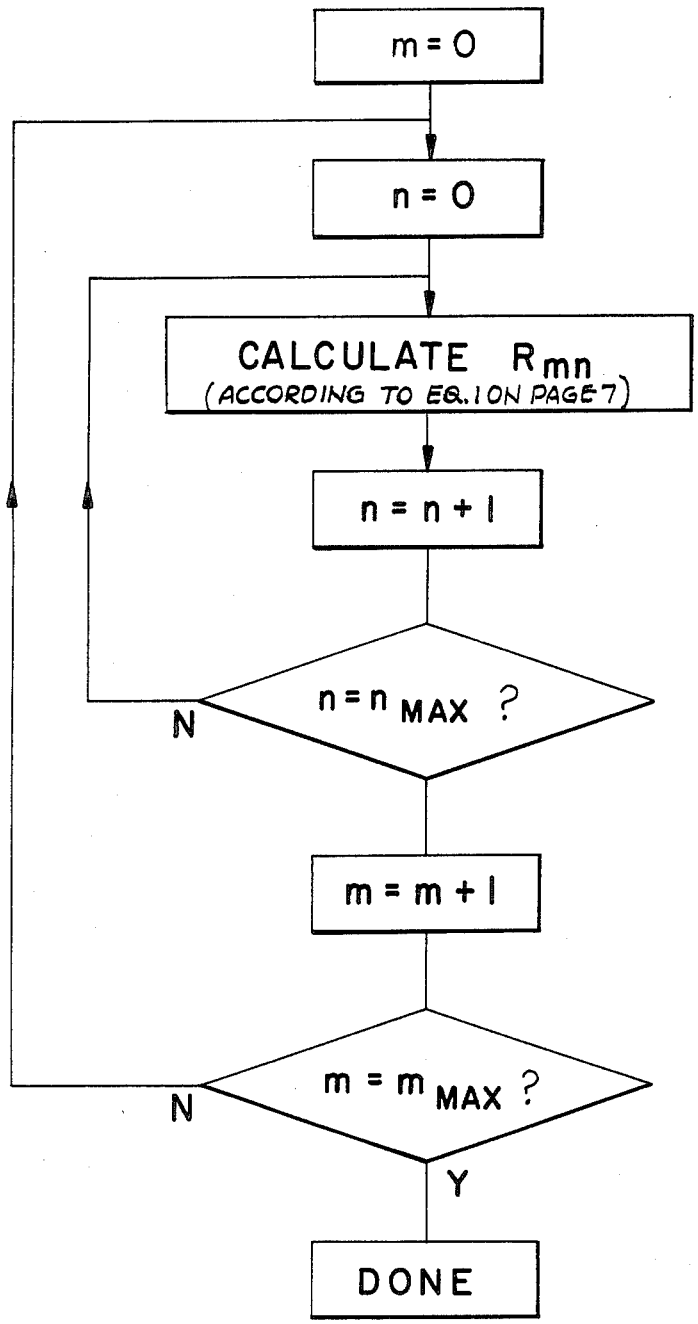
FIG. 5 is a flowchart documenting the steps in calculating modified image data to reduce artifacts caused by the discrete number of data gathering views in a computed tomography scan.

An interpolation scheme according to my invention is developed that depends only upon the row and column number of the pixel. The following examples demonstrate this scheme:

let $P_{mn}$ denote the pixel of column m and row n
  x = horizontal distance to center of $P_{mn}$ from the center of image matrix (FIG. 4).
  y = vertical distance to center of $P_{mn}$ from center of image matrix (FIG. 4).
let $D_{mn}$ denote the value of pixel $P_{mn}$.

$\Delta\alpha$ denotes the angle through which the image is rotated.
  d denotes the distance the center of $P_{mn}$ moves when rotated thru the angle $\Delta\alpha$.

If $\Delta\alpha$ is small then $d \simeq \Delta\alpha\sqrt{x^2+y^2}$. Let "a" denote the horizontal spacing between adjacent pixels. If we express d in its x and y components and normalize to "a" we have $d_x = \Delta\alpha \cdot y/a$ and $d_y = \Delta\alpha \cdot x/a$ An interpolation scheme using eight neighbor pixels is developed as follows:

let $D_{mn}$ denote the value of $P_{mn}$ pixel of the original image $I_1$
$D_{mnu}$ denotes the value of $P_{mn}$ of (clockwise $+\Delta\alpha$) rotated image $I_2$.
$D_{mnux}$ denotes the x component of $D_{mnu}$
$D_{mnuy}$ denotes the y component of $D_{mnu}$
$D_{mnv}$ denotes the value of $P_{mn}$ of (counter-clockwise $-\Delta\alpha$) rotated image $I_2$.
$D_{mnvx}$ denotes x component of $D_{mnv}$
$D_{mnvy}$ denotes y component of $D_{mnv}$
$R_{mn}$ denotes the value of $P_{mn}$ of the final post processed image so that:

$$R_{mn} = \tfrac{1}{2}D_{mn} + \tfrac{1}{4}D_{mnu} + \tfrac{1}{4}D_{mnv}$$

If one assumes that values of $d_x$ for pixels neighboring $P_{mn}$ are approximately the same and likewise that values of $d_y$ are approximately equal and further that $|d_x| \leq 1$ and $|d_y| \leq 1$ Then, for the pixels neighboring $P_{mn}$:

$$D_{m(n-1)ux} = D_{m(n-1)}(1 - d_x) + D_{(m-1)(n-1)} d_x$$

$$D_{mnux} = D_{mn}(1 - d_x) + D_{(m-1)n} d_x$$

$$D_{mnu} = D_{mnux}(1 - d_y) + D_{m(n-1)ux} d_y$$

$$D_{mnu} = D_{mn}(1 - d_x)(1 - d_y) + D_{(m-1)n} d_x (1 - d_y) +$$
$$D_{m(n-1)}(1 - d_x)d_y\, D_{(m-1)(n-1)}\, d_x d_y$$

$$D_{mnu} = D_{mn} - D_{mn} d_y - D_{mn} d_x + D_{mn} d_y d_x +$$
$$D_{(m-1)n} d_x - D_{(m-1)n} d_y d_x +$$
$$D_{m(n-1)} d_y - D_{m(n-1)} d_y d_x +$$
$$D_{(m-1)(n-1)} d_y d_x$$

$$D_{mnu} = D_{mn} + d_y [D_{m(n-1)} - D_{mn}] + d_x [D_{(m-1)n} - D_{mn}] + d_y d_x [D_{mn} - D_{(m-1)n} - D_{m(n-1)} + D_{(m-1)(n-1)}]$$

similarly $$D_{mnv} = D_{mn} + d_y [D_{m(n+1)} - D_{mn}] + d_x [D_{(m+1)n} - D_{mn}] + d_y d_x [D_{mn} - D_{(m+1)n} - D_{m(n+1)} + D_{(m-1)(n-1)}]$$

Substituting these values into the derived relationship for $R_{mn}$ gives equation (1).

Recalling that $d_x = \Delta\alpha y/a$ and $d_y = \Delta\alpha x/a$, the distances x and y can be expressed as $x = ma$ and $y = na$. Thus $d_x = \Delta\alpha n$ and $d_y = \Delta\alpha m$. Substituting into equation 1 gives:

$$R_{mn} = D_{mn} + \frac{\Delta\alpha m}{4}[D_{m(n-1)} + D_{m(n+1)} - 2D_{mn}] +$$

$$\frac{\Delta\alpha n}{4}[D_{(m-1)n} + D_{(m+1)n} - 2D_{mn}] +$$

$$\frac{(\Delta\alpha)^2 mn}{4}[2D_{mn} + D_{(m+1)(n+1)} + D_{(m-1)(n-1)} -$$

-continued $$D_{(m-1)n} - D_{(m+1)n} - D_{m(n-1)} - D_{m(n+1)}]$$

An alternate interpolation scheme using four neighboring points can be developed:

$$R_{mn} = D_{mn} + \frac{\Delta a_m}{4}[D_{m(n-1)} + D_{m(n+1)} - 2D_{mn}] +$$

$$\frac{\Delta a_n}{4}[D_{(m-1)n} + D_{(m+1)n} - 2D_{mn}]$$

Either the eight point or the four point process is one of adding (or subtracting) pixel values and multiplying by weighting coefficients. The coeficients can be stored in look-up tables or they can be generated by incrementing (or decrementing) registers. These methods result in an improvement in image on the console 14 that is comparable to doubling the number of angular views using prior art interpolation. The invention is not limited to the two disclosed processes nor is the method restricted to a doubling of views. It is the intent that the invention include all modifications and alterations falling within the spirit or scope of the appended claims.

What is claimed is:

1. A computed tomography scanner for imaging a subject, said scanner comprising:
    (a) means for obtaining real attenuation readings for radiation passing through a predetermined plane extending into the subject from a finite number of different angularly spaced orientations;
    (b) means for filtering said real attenuation readings and back projecting said filtered attenuation readings across a two dimensional array of image pixels to obtain an image corresponding to regions in said plane, and
    (c) post-processing means for reducing artifacts caused by there being only said finite number of angularly spaced orientations at which real readings are obtained, said post processing means including means for storing two dimensional weighing coefficients which vary as a function of image pixel location, said post processing means modifying, as a function of pixel location within said image, the represented image of at least some of said array regions by combining information by way of interpolation from said at least some regions with information scaled by said weighing coefficients corresponding to at least one nearby region in said image to approximate an image obtained by filtering and back projecting both real and interpolated attenuation readings.

2. The system of claim 1, wherein:
    said post processing means comprises means for approximating a modified image comprising the summation of the original image data, weighted by one half, plus the original image data weighted by one-fourth and rotated clockwise through an angle equal to one-half said angular spacing between the obtaining of successive readings, plus the original image weighted by one-fourth and rotated counterclockwise through the same angle.

3. In a computed tomography scanner, a method for enhancing images comprising the steps of:
    (a) obtaining real attenuation readings corresponding to radiation passing through a plane extending through a portion of a subject, said readings being obtained from radiation passing through said plane from each of a finite plurality of different orientations separated by angular scanning increments;
    (b) filtering said attenuation readings across a two dimensional array of pixels to obtain an image of regions in said plane, and
    (c) modifying said image subsequent to said filtering and back projecting step, and as a function of image location, for reducing artifacts caused by the spacing between orientations at which reading are obtained, said modifying step comprising producing two dimensional weighing coefficients as a function of image pixel location and combining information from a portion of said image with information scaled by said weighing coefficients from a nearby region to approximate an image obtained by filtering and back projecting both real and interpolated attenuation readings.

4. The method of claim 3, wherein said modifying step comprises:
    approximating a modified image which comprises the summation of the original real image, weighted by one-half, plus the real image weighted by one-fourth and rotated clockwise through an angle equal to one-half the angular increment between successive readings, plus data corresponding to the real image weighted by one-fourth and rotated counterclockwise through an angle equal to one-half the angular increment of spacing between successive orientations at which real readings are obtained.

5. The system of claim 1, wherein:
    said post processing means comprises means for approximating a modified image comprising the summation of the original image date, weighted by a factor of 1/n+1, where n equals the number of synthesized views between real views, plus the summation of the real image data, rotated clockwise, by factors of k/n+1, and weighted by factors of 1/(n+1)2, plus the summation of the real image data, rotated counterclockwise by factors of k/n+1, and weighted by factors of n+1−k/(n+1)2, where k is the set of integers from 1 to n.

* * * * *